United States Patent
Kohno et al.

(10) Patent No.: US 7,454,545 B2
(45) Date of Patent: Nov. 18, 2008

(54) INDIVIDUAL-ADAPTIVE SYSTEM AND INFORMATION DISTRIBUTION DEVICE BASED ON A CELLULAR TELEPHONE

(75) Inventors: Atsushi Kohno, Tokyo (JP); Mitsuo Shimotani, Tokyo (JP); Akio Uekawa, Tokyo (JP); Yosuke Asai, Tokyo (JP); Minoru Ozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1484 days.

(21) Appl. No.: 09/984,547

(22) Filed: Oct. 30, 2001

(65) Prior Publication Data

US 2002/0174427 A1 Nov. 21, 2002

(30) Foreign Application Priority Data

May 21, 2001 (JP) ............................. 2001-150578

(51) Int. Cl.
| G06F 13/12 | (2006.01) |
| G06F 3/00 | (2006.01) |
| H04M 11/00 | (2006.01) |
| B60D 1/28 | (2006.01) |

(52) U.S. Cl. ..................... 710/72; 710/8; 379/93.03; 180/271

(58) Field of Classification Search ............ None
See application file for complete search history.

(56) References Cited

U.S. PATENT DOCUMENTS 4,477,874 A * 10/1984 Ikuta et al. .................. 701/49
5,278,547 A * 1/1994 Suman et al. ............... 340/5.22
5,712,625 A * 1/1998 Murphy ..................... 340/5.22
6,275,231 B1 * 8/2001 Obradovich ................ 345/156
6,535,107 B1 * 3/2003 Bartz .......................... 340/5.2
2002/0107717 A1 * 8/2002 Liu et al. ..................... 705/10

FOREIGN PATENT DOCUMENTS

| DE | 199 20 227 | 11/2000 |
| DE | 199 34 837 | 1/2001 |
| EP | 1191486 A1 * | 3/2002 |
| JP | 2001-5783 | 1/2001 |
| JP | 2001-30849 | 2/2001 |
| JP | 2001-74473 | 3/2001 |
| WO | WO 94/04972 | 3/1994 |

* cited by examiner

*Primary Examiner*—Alan Chen
(74) *Attorney, Agent, or Firm*—Leydig, Voit & Mayer, Ltd.

(57) ABSTRACT

In an information distribution device for supporting an individual-adaptive system, when a car navigation system is employed as an individual-adaptive system, the system includes an individual identification section which can be connected to a portable cellular phone, enables entry of a portable cellular phone number from the portable cellular phone, and determines a setting status of a device in accordance with the input phone number; and an operation control section which controls the setting status of the device in accordance with the setting status determined by the individual identification section.

24 Claims, 17 Drawing Sheets

| PORTABLE CELLULAR PHONE NUMBER | OPENING PARAMETER |
|---|---|
| 090-1234-5678 | OPENING 1 |
| 090-8765-4321 | OPENING 2 |
| 090-7777-7777 | OPENING 1 |

USER PROFILE INFORMATION

| PORTABLE CELLULAR PHONE NUMBER | PALLET PARAMETER |
|---|---|
| 090-1234-5678 | PALLET 1 |
| 090-8765-4321 | PALLET 2 |
| 090-7777-7777 | PALLET 3 |

USER PROFILE INFORMATION

FIG. 7

| PALLET PARAMETER | MAP OBJECTS | | | |
| --- | --- | --- | --- | --- |
| | HIGHWAY | ORDINARY ROAD | BUILDINGS | HIGH RISERS |
| PALLET 1 | BLUE | SKY BLUE | BROWN | ORANGE |
| PALLET 2 | RED | ORANGE | BLUE | SKY BLUE |
| PALLET 3 | RED | PINK | BEIGE | LIGHT GREEN |
| PALLET 4 | GREEN | LIGHT GREEN | GRAY | ORANGE |

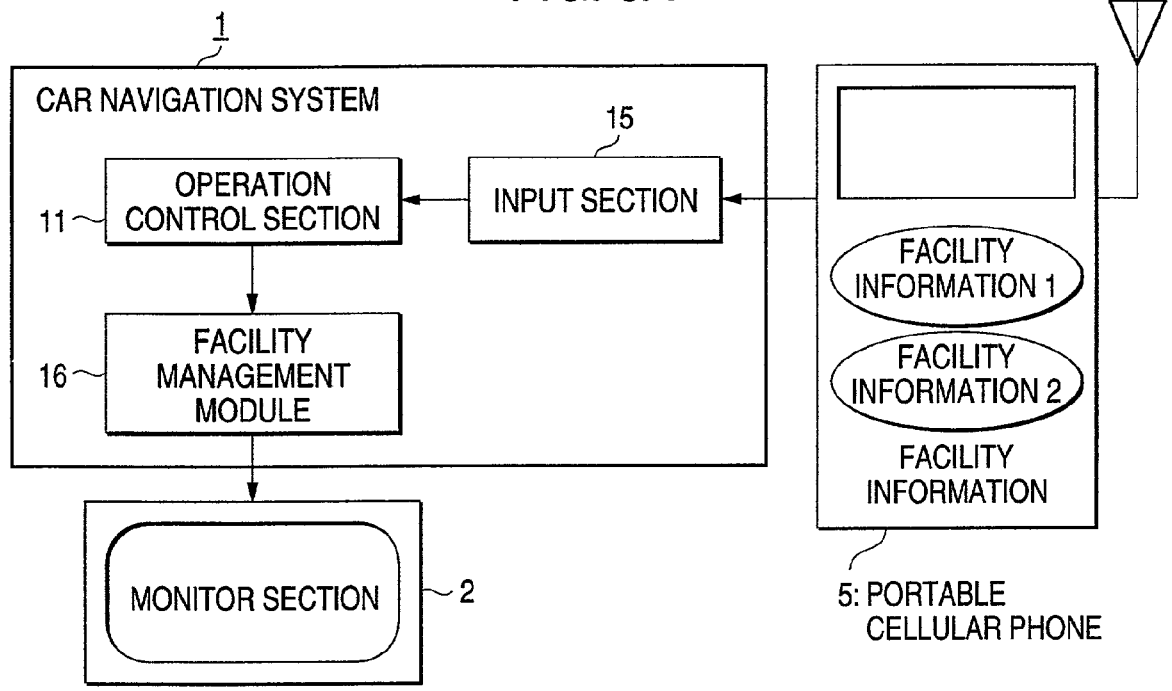

| PORTABLE CELLULAR PHONE NUMBER | SEAT POSITION PARAMETER ||
|---|---|---|
| | DISTANCE | ANGLE |
| 090-1234-5678 | 30 | 45° |
| 090-8765-4321 | 20 | 48° |
| 090-7777-7777 | 45 | 55° |

USER PROFILE INFORMATION

USER PROFILE INFORMATION

| PORTABLE CELLULAR PHONE NUMBER | OPENING PARAMETER |
|---|---|
| 090-1234-5678 | OPENING 1 |
| 090-8765-4321 | OPENING 2 |
| 090-7777-7777 | OPENING 1 |

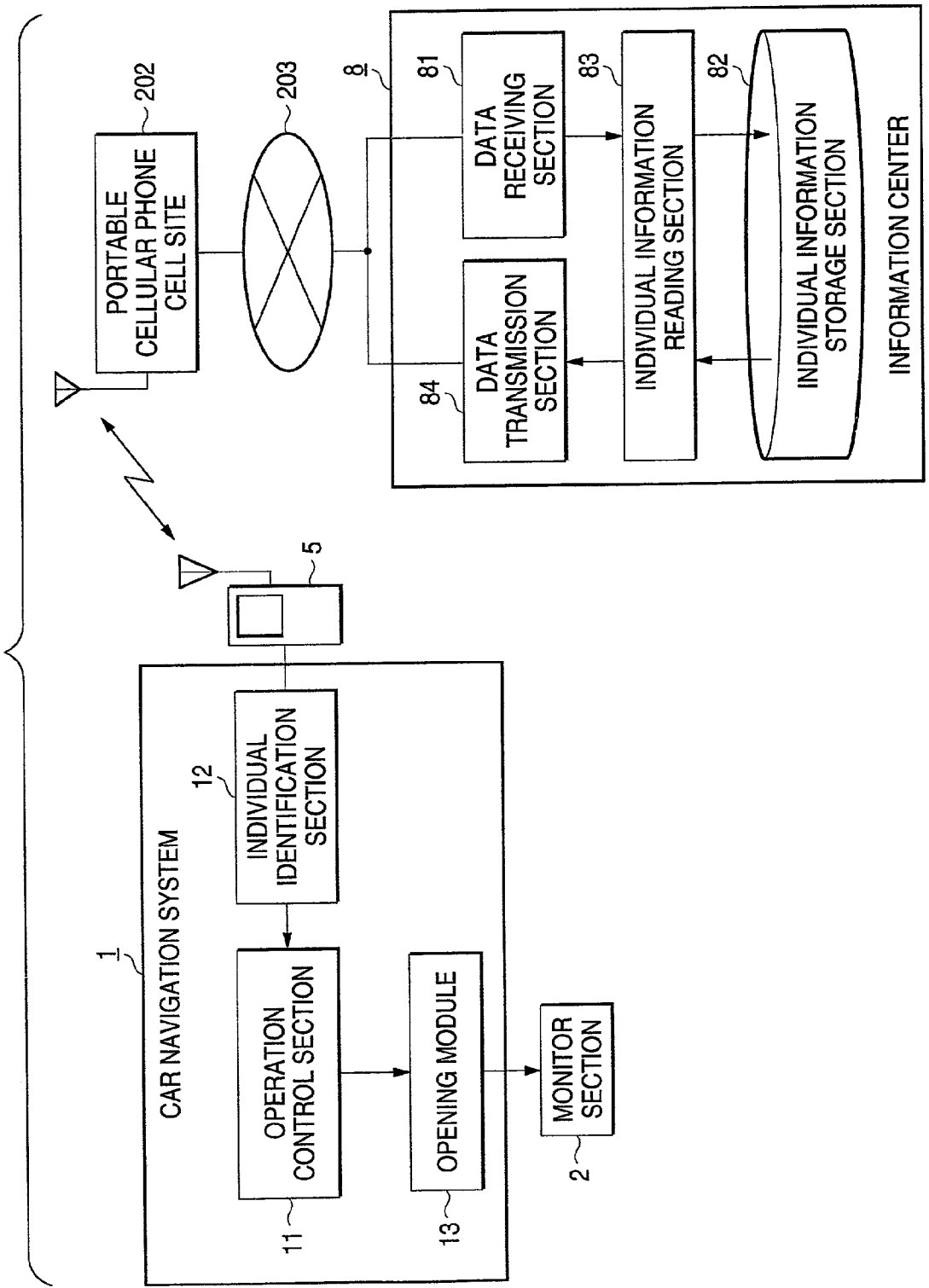

USER PROFILE INFORMATION

TRANSMISSION INFORMATION

FIG. 14B

USER PROFILE INFORMATION 307

| PORTABLE CELLULAR PHONE NUMBER | OPENING PARAMETER ||
|---|---|---|
| | STATIONARY IMAGE | MOTION PICTURE |
| 090-1234-5678 | OPENING 1 | ANIMATION 1 |
| 090-8765-4321 | OPENING 2 | ANIMATION 2 |
| 090-7777-7777 | OPENING 1 | ANIMATION 3 |

FIG. 14C

TRANSMISSION INFORMATION (FOR INFORMATION TERMINAL DEVICE) 309

| OPENING PARAMETER ||
|---|---|
| STATIONARY IMAGE | MOTION PICTURE |
| OPENING 1 | ANIMATION 3 |

TRANSMISSION INFORMATION (FOR CAR NAVIGATION SYSTEM) 310

| OPENING PARAMETER |
|---|
| STATIONARY IMAGE |
| OPENING 1 |

USER PROFILE INFORMATION 311

| PORTABLE CELLULAR PHONE NUMBER | CH SETTING PARAMETER |
|---|---|
| 090-1234-5678 | CH SETTING 1 |
| 090-8765-4321 | CH SETTING 2 |
| 090-7777-7777 | CH SETTING 3 |

| CH SETTING PARAMETER | CH NUMBER | | |
|---|---|---|---|
| | 1 | 2 | 3 |
| CH SETTING 1 | TELEVISION OSAKA | NHK | KBS KYOTO |
| CH SETTING 2 | NHK | NHK EDUCATION | TELEVISION OSAKA |
| CH SETTING 3 | ABC | MBS | YOMIURI TELEVISION |

INDIVIDUAL-ADAPTIVE SYSTEM AND INFORMATION DISTRIBUTION DEVICE BASED ON A CELLULAR TELEPHONE

BACKGROUND OF THE INVENTION

1. Field of the Invention

The present invention relates to an individual-adaptive system automatically changing operations adaptive to a user without the user performing a special operation, as well as to an information distribution device for supporting the individual-adaptive system. A device installed in a vehicle is suitable for use with a car navigation system installed on a common automobile or for use with various types of controllers for controlling seat positions, mirror positions, or the engine. Further, the device is suitable for controlling settings of a display screen or sound output of an information terminal device, such as a personal digital assistant (PDA), or a personal computer.

2. Description of the Related Art

A related-art car navigation system does not allow a user to change the color of a startup screen appearing at the time of system startup or the color of a map appearing on a car navigation system. However, so long as a startup screen recorded in a memory card has been loaded or a plurality of settings of map colors have been prepared, a recent car navigation system has made it possible to change the startup screen or the map color so as to meet the user's preference.

For instance, a DVD car navigation system "CN-DV2520IXD" manufactured by Matsushita Communication Industrial Co., Ltd. and Matsushita Electric Industrial Co., Ltd. enables changing of a startup screen by means of selecting the name of an image data file recorded on a smart medium with the aid of a user setting changing function of the car navigation system.

This navigation system enables selection of one from four types of map colors: "Soft," "Pastel," "Pop," and "Dimmer," for the color of a map appearing on the car navigation system.

As mentioned above, the related-art navigation system enables the user to freely select settings, thereby changing the settings so as to meet his preference. However, the thus-selected settings are not stored in association with information for specifying a user. Hence, if another user uses the system even on only one occasion and changes the settings, the original user is required to select changes from the beginning when attempting to use the system again.

SUMMARY OF THE INVENTION

The present invention has been conceived to solve the drawback set forth. The present invention is aimed at providing an individual-adaptive system which is not limited to an in-vehicle system, such as a car navigation system. The system enables a common general-purpose device, the device not being limited to a specific user and being able to be used by anybody, to be automatically used as a personal device suitable for a user in combination with a personal ID card or a portable cellular phone, which can be carried about by a person, or with another portable personal specification means, without involvement of the user performing a special operation.

The present invention is also aimed at providing information distribution device for supporting such an individual-adaptive system.

To achieve the above object, the present invention provides an individual-adaptive system comprising: an individual identification section which can be connected to an individual identification information generator having individual identification information, enables entry of individual identification information from the individual identification information generator, and determines a setting status of a device in accordance with the input individual identification information; and an operation control section which controls the setting status of the device on the basis of the setting status determined by the individual identification section.

The present invention also provides an individual-adaptive system comprising: an individual identification section which can be connected to an individual identification information generator having individual identification information, enables entry of individual identification information from the individual identification information generator, and determines a setting status of a device installed in a vehicle in accordance with the input individual identification information; and an operation control section which controls the setting status of the device on the basis of the setting status set by the individual identification section.

Preferably, the individual identification section has storage means for storing individual identification information and the setting status of the system corresponding to the individual identification information, and compares the individual identification information entered from the individual identification information generator with the individual identification information stored in the storage means, thereby determining as the setting status of the system a setting status corresponding to a matched individual identification information.

Preferably, the individual-adaptive system further comprises means for adding to or changing the individual identification information stored in the storage means or the setting status of a device corresponding to the individual identification information.

Preferably, a setting status of a device corresponding to individual identification information stored in the storage means is stored by means of a setting status identification code for specifying one from a plurality of predetermined setting statuses of the device.

Preferably, the individual-adaptive system further comprises communications means capable of establishing communication with an information distribution device which stores individual identification information and setting information about a device corresponding to the individual identification information. Further, the individual identification section transmits, to the information distribution device by way of the communications means, individual identification information entered from the individual identification information generator and receives, from the information distribution device, setting information about a device corresponding to the individual identification information, thereby determining the setting status of the device.

Preferably, the individual identification section can be connected to an individual identification information generator having individual identification information and communications means; transmits individual identification information entered from the individual identification information generator to an information distribution device which stores individual identification information and setting information about a device corresponding to the individual identification information, by way of the communications means of the individual identification information generator; and receives setting information about a device corresponding to the individual identification information from the information distribution device, thereby determining the setting status of the device.

The present invention also provides an individual-adaptive system comprising: an input section which can be connected to an individual identification information generator having stored therein individual identification information and setting information about a device; and which inputs the setting information from the individual identification information generator; and an operation control section for controlling the setting status of the device in accordance with the entered setting information.

The present invention also provides an individual-adaptive system comprising: an input/output section which can be connected to an individual identification information generator having individual identification information and communications means; issues an instruction for sending the individual identification information, to an information distribution device which stores individual identification information and setting information about a device corresponding to the individual identification information; and inputs into the individual identification information setting information about the device acquired from the information distribution device; and an operation control section for controlling the setting status of the device on the basis of the entered setting information.

Preferably, the individual-adaptive system has device type identification information; outputs the device type identification information to the individual identification information generator or the information distribution device; and acquires setting information about a device corresponding to the device type identification information from the information distribution device.

Preferably, only required setting information is extracted from setting information entered from the individual identification information generator or the information distribution device.

The present invention also provides an information distribution device comprising: storage means for storing individual identification information and setting information about an individual-adaptive system corresponding to the individual identification information; receiving means for receiving individual identification information from the individual-adaptive system; reading means for comparing the received individual identification information with the individual identification information stored in the storage means and for reading from the storage means setting information corresponding to matched individual identification information; and transmission means for transmitting the read setting information to the individual-adaptive system.

Preferably, the receiving means receives, from the individual-adaptive system, device type identification information about the individual-adaptive system and individual identification information. Moreover, reading means reads from storage means setting information corresponding to the device type identification information and individual identification information.

BRIEF DESCRIPTION OF THE DRAWINGS

FIG. 7 is a table showing palette parameter according to the fourth embodiment;

FIGS. 8A to 8C are illustrations showing a car navigation system according to a fifth embodiment of the present invention;

FIGS. 12A to 12C are illustrations showing a car navigation system according to an eighth embodiment of the present invention;

FIGS. 14A to 14C are illustrations showing a car navigation system and an information terminal device according to an eleventh embodiment of the present invention.

DETAILED DESCRIPTION OF THE PREFERRED EMBODIMENTS

Now, a description will be given in more detail of preferred embodiments of the invention with reference to the accompanying drawings.

First Embodiment

Figure 1:
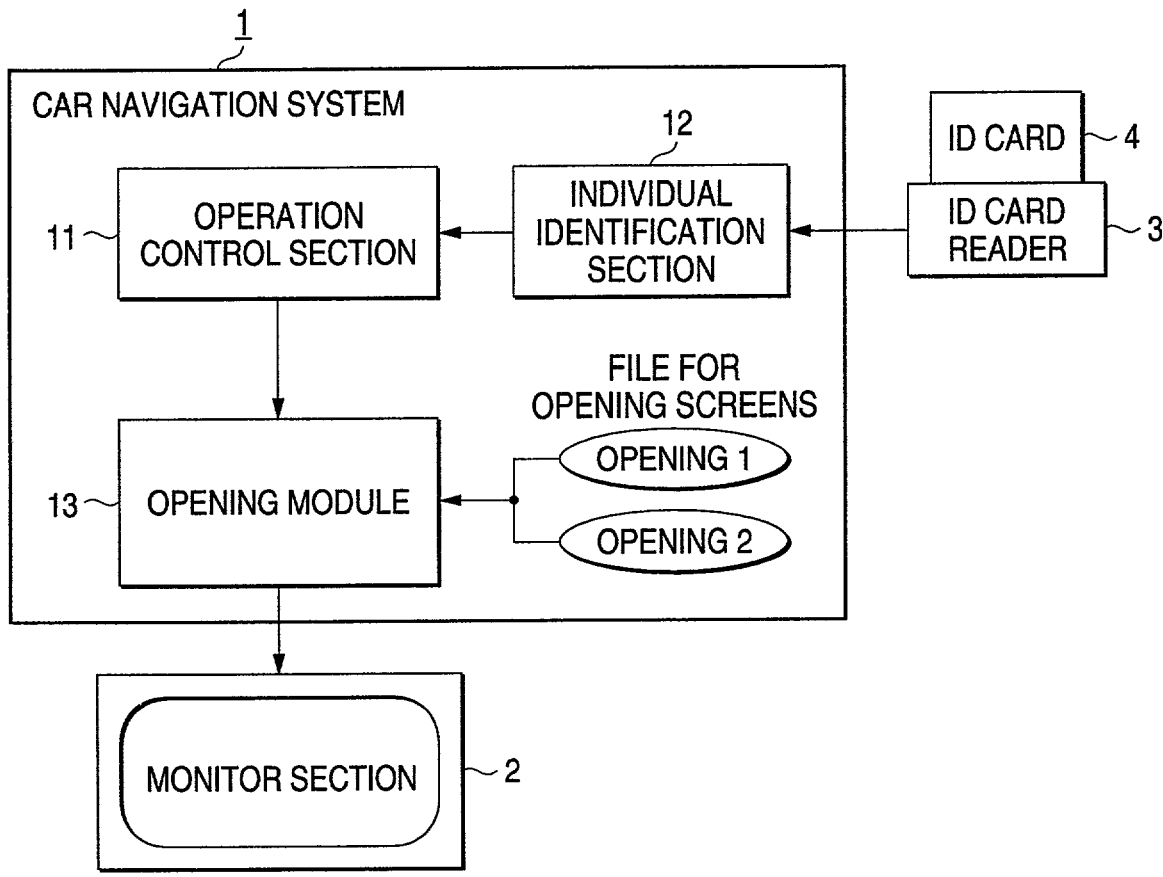
FIGS. 1A and 1B are illustrations showing a car navigation system according to a first embodiment of the present invention.

FIGS. 1A and 1B are diagrams showing an example in which an individual-adaptive system according to a first embodiment of the present invention is applied to a car navigation system to be installed on a vehicle. FIG. 1A is a block diagram showing the car navigation system, and FIG. 1B is a table showing an example of user profile information according to the first embodiment. As shown in the drawings, reference numeral 1 designates a car navigation system; 2 designates a monitor section; 4 designates an ID card (an individual identifying information generator) having individual identifying information for specifying an individual, such as an individual ID number; and 3 designates an ID card reader for reading an individual ID number (individual identifying information) recorded on the ID card 4. The car navigation system 1 comprises an operation control section 11, an individual identification section 12, and an opening module 13. Reference numeral 301 designates user profile information formed from individual IDs and opening parameters, which are associated with each other.

Operations of the constituent elements of the car navigation system 1 will now be described. By means of the ID card reader 3, the individual identification section 12 acquires a personal ID recorded on the ID card 4. An opening parameter is determined from the thus-acquired personal ID in accordance with a method to be described later. The thus-determined opening parameter is transmitted to the operation control section 11. The operation control section 11 transmits, to the opening module 13, an opening parameter transmitted from the individual identification section 12, thereby activating the opening module 13. In accordance with an opening parameter transmitted from the operation control section 11, the opening module 13 reads a bitmapped file for use with an opening screen. The thus-read file is displayed on the monitor 2.

The opening parameter is a setting status identification code for specifying one from a plurality of predetermined opening screens in the car navigation system. The name of a bitmapped file (e.g., "opening1.bmp" or "opening2.bmp") to be read by the opening module 13 is described in the opening parameter. The bitmapped files are to be used for an opening screen appearing at the time of startup of the car navigation system. The bitmapped files are stored in the car navigation system beforehand.

The ID card reader 3 performs an operation for reading an individual ID recorded in a predetermined location on the ID card 4 by means of a predetermined method, and sends the thus-read individual ID to the individual identification section 12.

Figure 2:
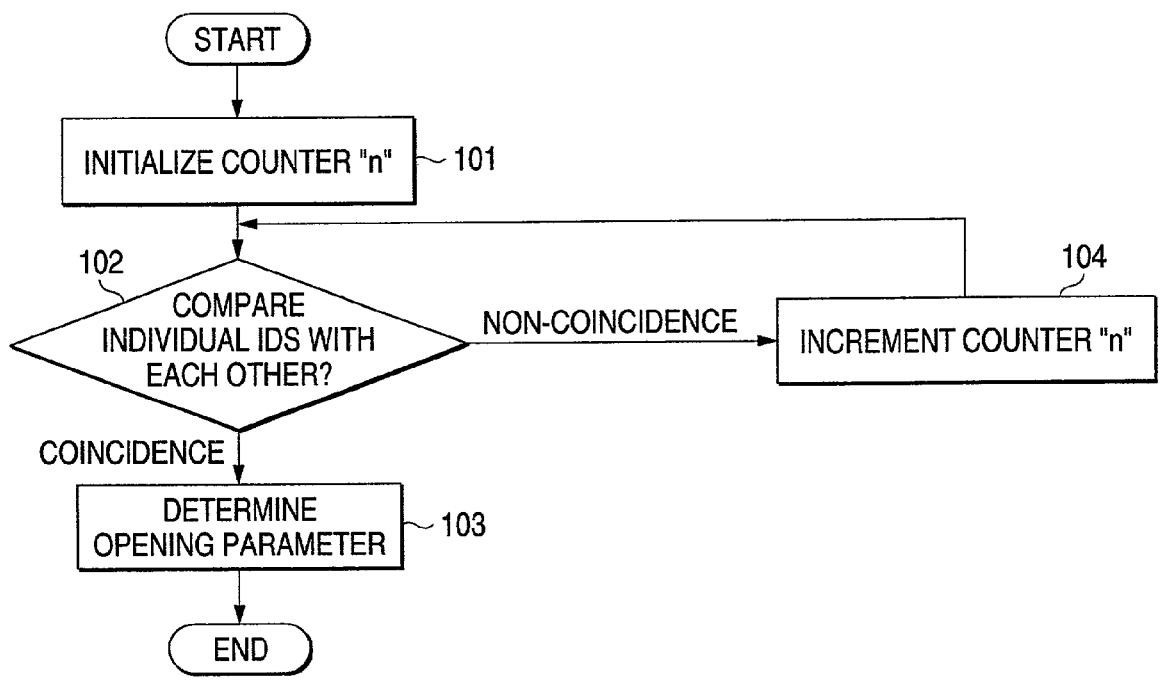
FIG. 2 is a flowchart showing operations of an individual identification section according to the first embodiment.

Determination of an opening parameter performed by the individual identification section 12 will be described by reference to a flowchart shown in FIG. 2. As shown in FIG. 1B, the individual identification section 12 has storage means, and preset user profile information 301 is provided in the storage means beforehand. In step 101, a counter "n" is initialized (n=1). Subsequently, the individual ID number read from the ID card 4 by means of the ID card reader 3 is compared with an ID described in the $n^{th}$ individual ID row of the user profile information (step 102). If match exists therebetween, the parameter described in the $n^{th}$ opening parameter column is determined to be an opening parameter corresponding to the acquired individual ID (step 103). If no match exists therebetween, the counter "n" is incremented (step 104), and processing returns to comparison between individual Ids (step 102). Thus, operations are iterated.

As mentioned above, according to the first embodiment, the individual identification section 12 of the car navigation system 1 determines an opening screen corresponding to an individual ID recorded on the ID card 4. Further, the operation control section 11 controls the opening module 13 so as to display the thus-determined opening screen. Hence, a startup screen of the car navigation system suitable for the user (i.e., meeting the user's preference) can be set automatically, by means of the user merely inserting his ID card into the ID card reader 3.

Figure 3:
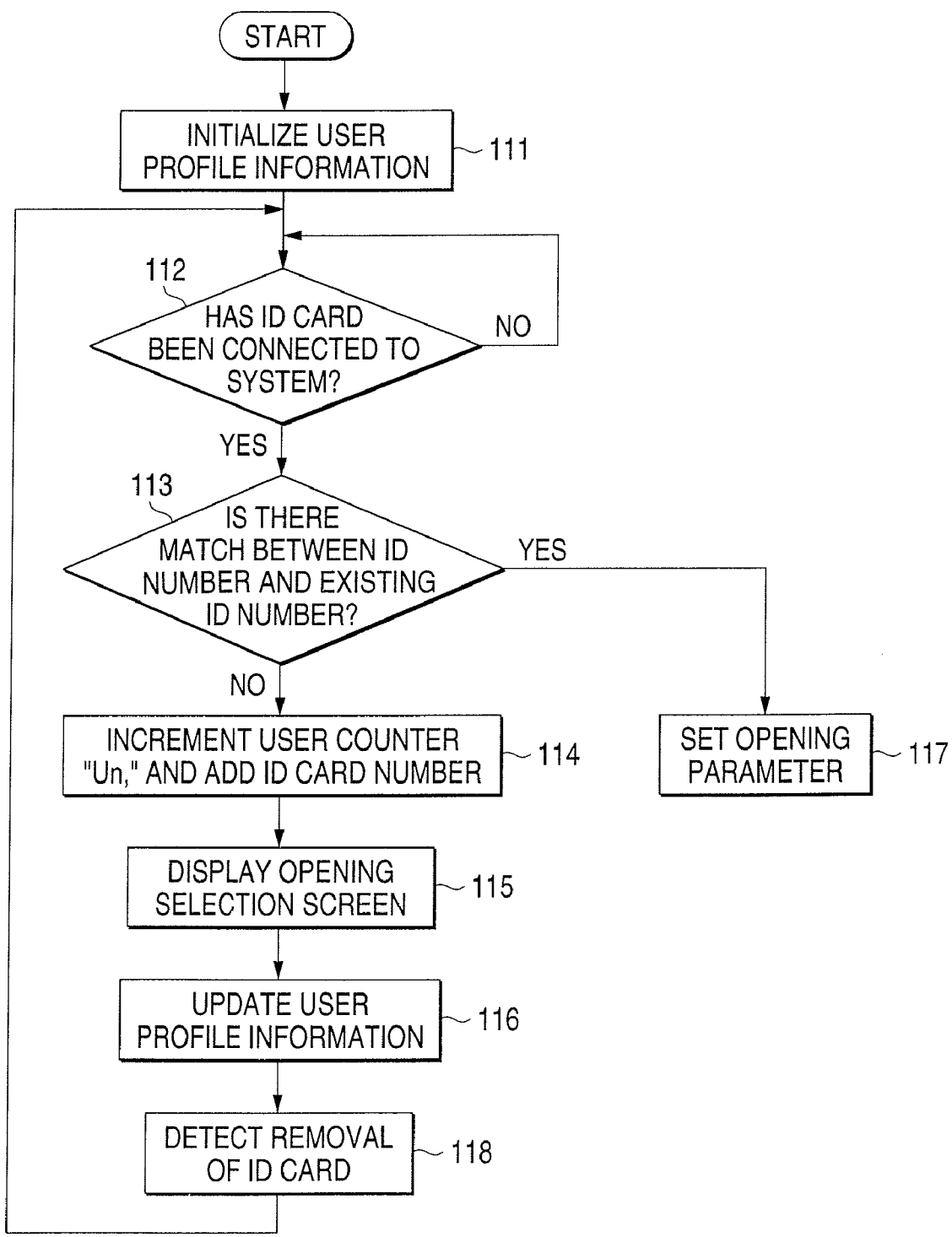
FIG. 3 is a flowchart showing addition and updating of user profile information according to the first embodiment.

The present embodiment has shown a case in which user profile information items 301 corresponding to a plurality of users are stored in the individual identification section 12, of the car navigation system beforehand. Alternatively, every time a new user connects his ID card to the navigation system, the user profile information items may be updated to new user profile information items to which a new individual ID and a corresponding opening parameter are added. FIG. 3 shows a flowchart of an operation for adding information to and for updating the user profile information items.

Figure 4:
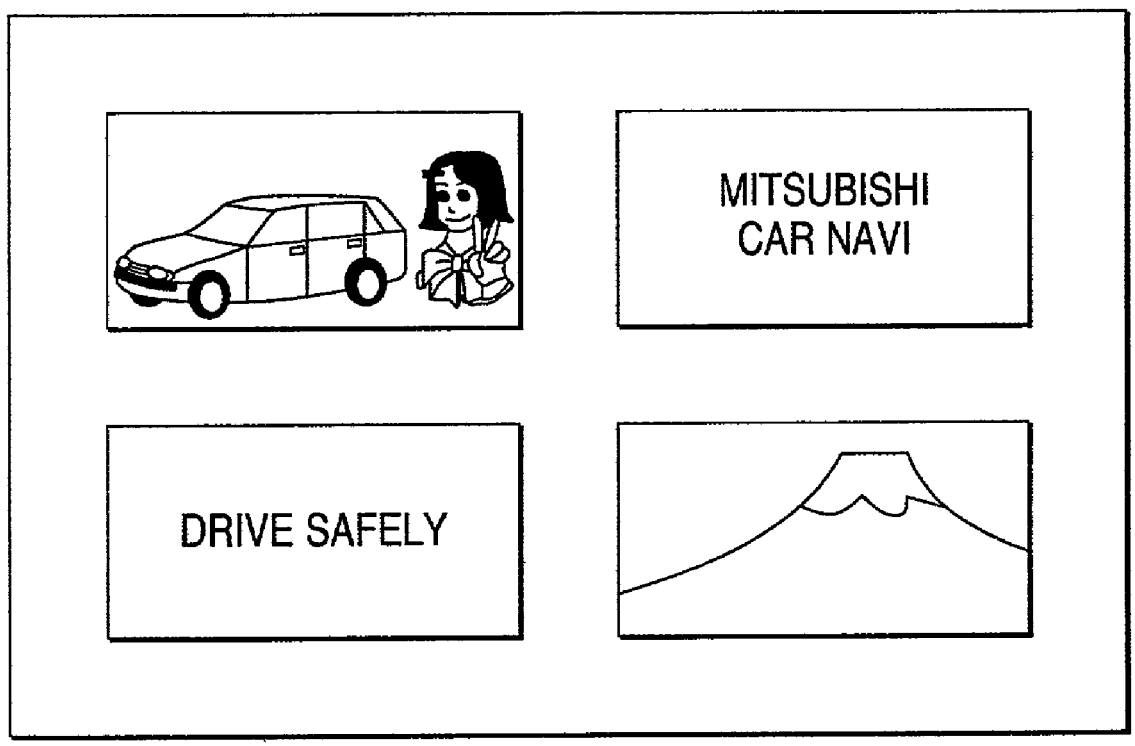
FIG. 4 is an illustration showing an opening screen selection screen according to the first embodiment.

After user profile information items and the user counter "n" have been initialized (step 111), a determination is made as to whether or not an ID card is connected to the navigation system (step 112). If no ID card is connected to the car navigation system, a determination operation is continued until an ID card is connected to the system. If an ID card is determined to be connected to the system, an individual ID of the connected ID card is read. A determination is then made as to whether or not the individual ID is present in an individual ID row stored in the existing user profile information (step 113). If the individual ID is present, settings are effected through use of a registered opening parameter (step 117). If the individual ID is not present, the user counter "n" is incremented. Then, the individual ID is added to the $Un^{th}$ row of the user profile information items (step 114), thereby displaying, to the user, an opening screen selection screen such as that shown in FIG. 4 (step 115). The screen selected by the user is displayed, and the opening parameter on the screen is added to the $Un^{th}$ row of the user profile information items (step 116). Subsequently, removal of the ID card is detected (step 118), and processing returns to determination of connection of an ID card (step 112).

In the first embodiment, the name of a bitmapped file for an opening screen is taken as an opening parameter. However, character information to be displayed on an opening screen, a screen display time of an opening screen, a display color of the same, the name of a file of sound data to be output at the time of opening, or a musical chord of the sound data may be employed as an opening parameter.

In the first embodiment, an opening parameter is set, through use of the user profile information which has been set beforehand by the individual identification section 12. An opening parameter may be determined by means of subjecting an individual ID number to threshold processing. For instance, if an individual ID number falls within the range from 000 to 099 (less than 100), the name of an opening screen file is set to opening1.bmp. In contrast, if an individual ID number falls within the range from 100 to 199 (greater than 100), the name of an opening screen file is set to opening2.bmp.

Second Embodiment

Figures 5A, 5B:
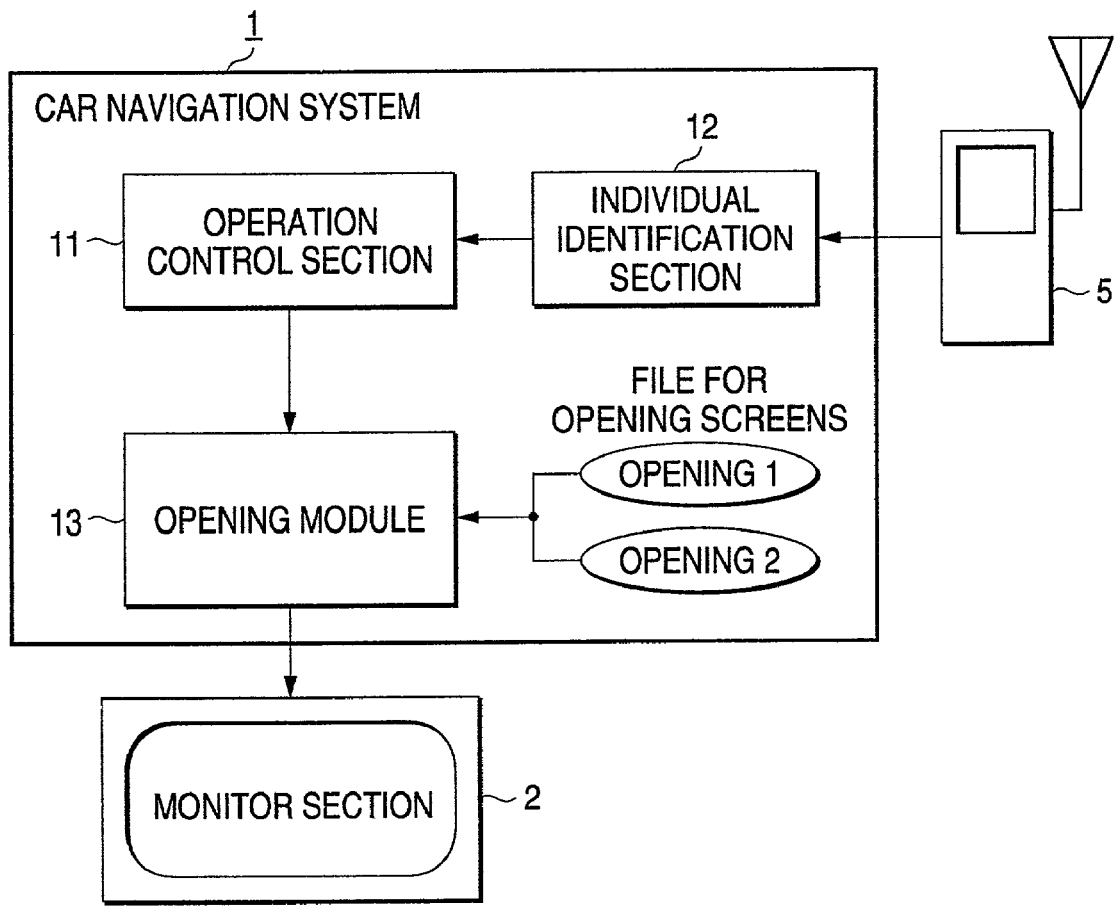
FIGS. 5A and 5B are illustrations showing a car navigation system according to a second embodiment of the present invention.

In the first embodiment, an ID card is employed as an individual identification information generator having individual identification information, and individual identification information is obtained through use of an ID card reader. A portable cellular phone having a unique device number, such as a telephone number, may also be used as an individual identification information generator in place of an ID card reader and an ID card. FIGS. 5A and 5B are diagrams showing a car navigation system according to a second embodiment of the present invention, wherein FIG. 5A is a block diagram and FIG. 5B is a diagram showing an example of user profile information. As shown in the drawings, reference numeral 5 designates a portable cellular phone, and the cellular phone is connected to a serial port of the car navigation system 1. Reference numeral 302 designates user profile information in which portable cellular phone numbers are associated with opening parameters. The constituent elements of the car navigation system 1 and those of the monitor 2 are identical with those described in connection with the first embodiment.

The operation of the car navigation system 1 will next be described.

In the car navigation system 1 shown in FIGS. 5A and 5B, the individual identification section 12 acquires a portable cellular phone number from the portable cellular phone 5 through use of an AT command (in practice, a command "AT&P" is issued). An opening parameter corresponding to the thus-acquired portable cellular phone number is determined (since the determination operation can be described by means of replacing the individual ID of the user profile information 301 described in connection with the first embodiment with the portable cellular phone number, repetition of the detailed explanation thereof is omitted). The thus-determined opening parameter is transmitted to the operation control section 11. Processing to be performed by the operation control section 11 and that performed by the opening module 13 are the same as those described in connection with the first embodiment.

As mentioned above, in the second embodiment, the individual identification section 12 of the car navigation system 1 acquires a phone number from the portable cellular phone 5 and determines an opening screen corresponding to the thus-acquired phone number. The operation control section 11 controls the opening module 13 such that the thus-determined opening screen is displayed. Hence, mere connection of a portable cellular phone to the car navigation system 1 enables the user to automatically set in the car navigation system 1 a startup screen adaptive to the user (i.e., meeting the user's preference).

In contrast with a case where a rewritable ID card is used, use of a phone number unique to a portable cellular phone eliminates a worry about a chance of another person rewriting the user's ID.

A portable cellular phone serving as an individual identification information generator is personal device usually carried about by an individual. Hence, connection of a portable cellular phone to the car navigation system 1 yields an advantage of the ability to change general-purpose device to a device devoted solely to an individual.

In the second embodiment, a phone number is employed as a number unique to the portable cellular phone. Alternatively, a model number of the phone or internal information stored in a SIM (subscriber identity module) card provided in a GSM modular phone may also be employed.

Third Embodiment

In the second embodiment, user profile information is stored in an individual identification section of the car navigation system 1. Alternatively, setting information pertaining to, for example, opening screen is recorded in a portable cellular phone under the name of a bitmapped file. The car navigation system 1 may acquire the name of a bitmapped file recorded in the portable cellular phone and display an opening screen in accordance with the name of the bitmapped file acquired by the control operation section 11.

In this case, there is no necessity of the individual identification section 12 entering individual identification information and determining an opening parameter in accordance with the thus-entered individual identification information. The only requirement is that the car navigation system 1 have a function of acting as an input section by way of which setting information pertaining to an opening screen is entered from a portable cellular phone. The car navigation system is identical in construction with that shown in FIG. 5A, and the individual identification section 12 serves as an input section.

In the third embodiment, there is no necessity of storing user profile information in the car navigation system 1, and therefore the amount of memory space required by the car navigation system 1 is diminished.

In the third embodiment, a bitmapped file may be recorded as system setting information directly in a portable cellular phone. The car navigation system 1 may acquire the bitmapped file recorded in the portable cellular phone, and the control operation section 11 may display an opening screen in accordance with the bitmapped file acquired by the control operation section 11.

Fourth Embodiment

Figures 6A, 6B:
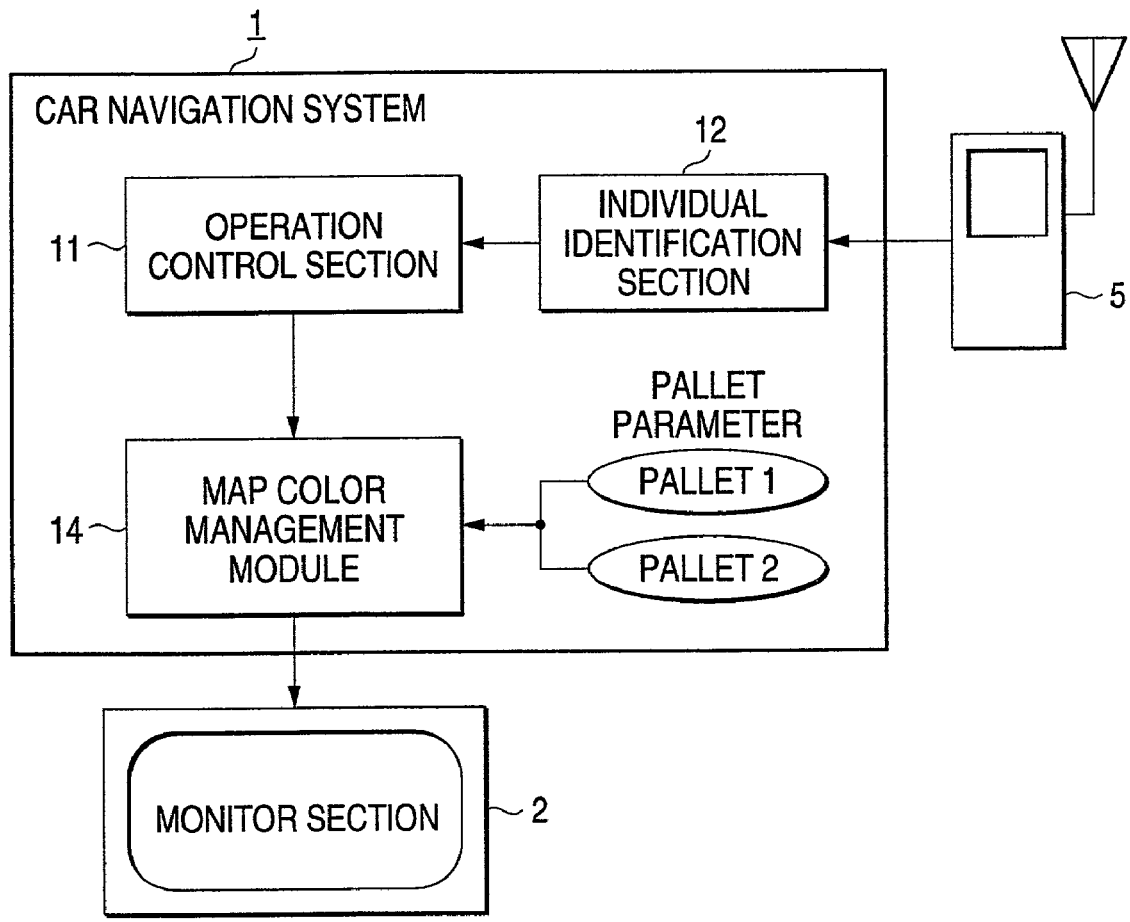
FIGS. 6A and 6B are illustrations showing a car navigation system according to a fourth embodiment of the present invention.

In the first through third embodiments, the opening screen output by the opening module 13 of the car navigation system 1 is automatically switched in accordance with the user. The color of the map appearing on the car navigation system may be changed in accordance with the user. A fourth embodiment, which is of this type, is shown in FIGS. 6A and 6B.

As shown in the drawings, the car navigation system 1 comprises the operation control section 11, the individual identification section 12, and a map color management module 14. Reference numeral 303 designates user profile information in which a portable cellular phone number is associated with a pallet parameter for defining colors of a map displayed by the car navigation system 1 (i.e., a setting status identification code for specifying one from a plurality of display colors).

The operation of the car navigation system will now be described. In the car navigation system 1 shown in FIGS. 6A and 6B, the individual identification section 12 acquires a portable cellular phone number from the portable cellular phone 5 in the same manner as in the second embodiment. A determination is made as to a pallet parameter corresponding to the thus-acquired portable cellular phone number (since the determination operation can be described by means of replacing the opening parameter of the user profile information 302 described in connection with the second embodiment with the pallet parameter, repetition of the detailed explanation thereof is omitted). The thus-determined pallet parameter is transmitted to the operation control section 11. The operation control section 11 transmits the pallet parameter sent from the individual identification section 12 to the map color management module 14. The map color management module 14 changes the display color of an object on a map in accordance with a transmitted pallet parameter.

As shown in FIG. 7, the pallet parameter corresponds to the setting status of a display color set for each display object on a map.

As has been described, in the fourth embodiment, the individual identification section 12 of the car navigation system 1 acquires a phone number from the portable cellular phone 3 and, in accordance with the thus-acquired phone number, determines the color of an object on the displayed map. The operation control section 11 controls the map color management module 14 such that a map is displayed in the determined object color. Hence, a map display suitable for the user can be automatically set by means of the user merely connecting his portable cellular phone to the car navigation system 1.

Fifth Embodiment

In the fourth embodiment, only the color of the map appearing on the car navigation system 1 is changed. It may also be possible to store, in a portable cellular phone to be connected to the car navigation system 1, facility information unique to a portable cellular phone (i.e., setting information about facilities to be displayed on a map when the map is displayed). By means of acquiring facility information from the portable cellular phone on a per-individual basis, the thus-acquired facility information may be added to the existing facility information possessed by the car navigation system 1, and a map display may be changed to another map display suitable for the user. FIGS. 8A, 8B, and 8C show a fifth embodiment, which is of such a type. As shown in the drawings, the car navigation system 1 comprises an operation control section 11, an input section 15, and a facility management module 16. Reference numerals 304a and 304b designate personal facility information items stored in the portable cellular phone 5, and 305 designates facility management information provided in the facility management module 16 beforehand. The facility management information represents locations of facilities in the form of latitudes and longitudes.

The operation of the car navigation system 1 will now be described.

As shown in FIGS. 8A to 8C, the input section 15 transmits a specific command to the portable cellular phone 5, thereby reading the facility information items 304a and 304b recorded in the portable cellular phone 5. The thus-read facility information is transmitted to the operation control section 11. The operation control section 11 transmits, to the facility management module 16, the facility information transmitted from the input section 15, thereby causing the facility management module 16 to update a map display. The facility management module 16 adds, to the facility management information 305, the facility information transmitted from the operation control section 11. The facility management module 16 adds, to the facility management information 305, the facility information transmitted from the operation control section 11, thereby performing an updating operation. When a specific command is transmitted from the input section 15, the portable cellular phone 5 transmits, to the input section 15, the facility information items 304a and 304b stored therein.

As mentioned above, in the fifth embodiment, the input section 15 of the car navigation system 1 reads facility information stored in the portable phone 5. The operation control section 11 controls the facility management module 16 such that the facility information is added to the facility management information possessed by the car navigation system 1 from beforehand. As a result, personal facility information of the user is displayed in conjunction with a map, thereby providing facility information in accordance with the user.

Although in the present embodiment the facility management information 305 possessed by the facility management module 16 is updated, registered location management information possessed by a registered location management module in the car navigation system 1 (i.e., specific facility management information managed in the same manner as is the facility management information 305) may be updated.

In the present embodiment, the facility information items 304a and 304b acquired from the portable cellular phone 5 are added to the facility management information 305. However, the registered location management information may be updated by use of a pointer. More specifically, the acquired facility information items 304a and 304b may be stored, and an address next to the final facility of the facility management information 305 possessed by the facility management module 16 may be set to the addresses of the stored facility information items 304a and 304b.

Sixth Embodiment

Figures 9A, 9B:
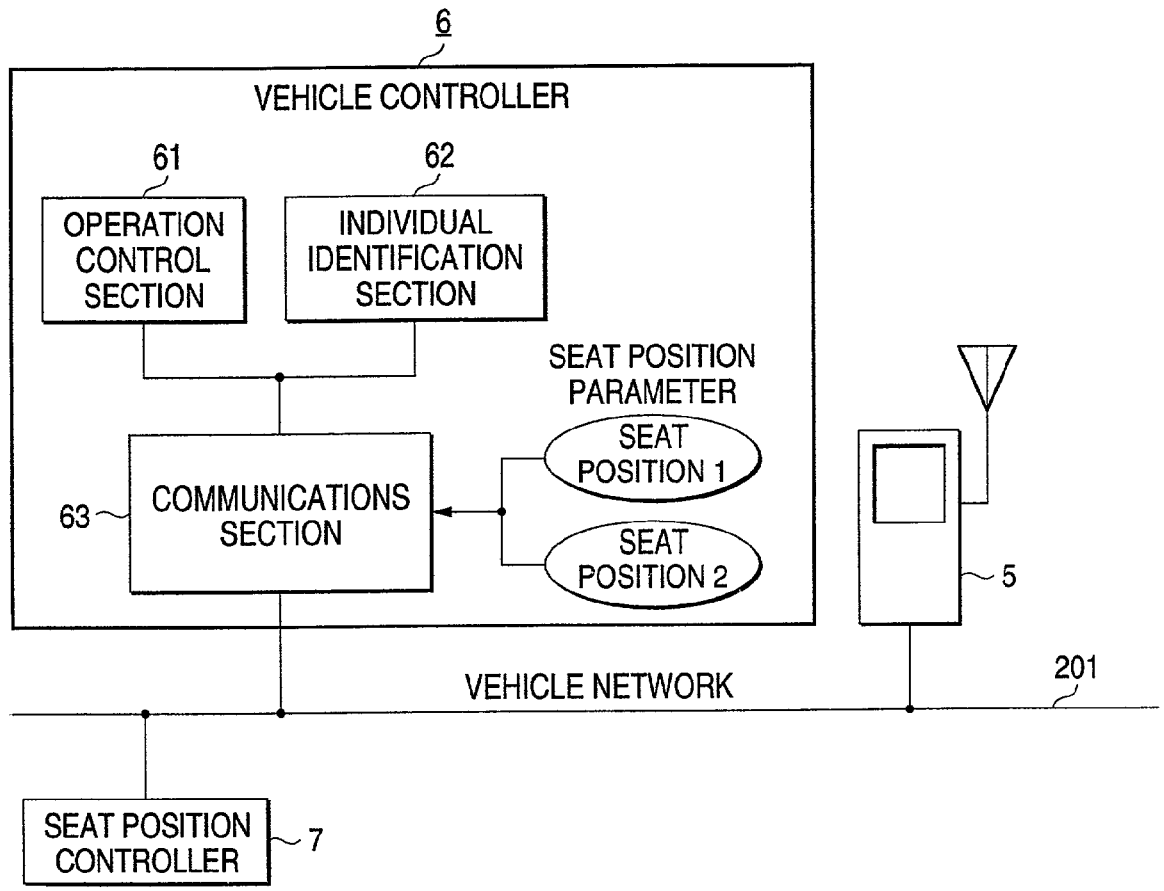
FIGS. 9A and 9B are illustrations showing a vehicle controller according to a sixth embodiment of the present invention.

The first through fifth embodiments have shown an example in which the individual-adaptive system is applied to an in-vehicle car navigation system. However, in the sixth embodiment, the individual-adaptive system is applied to a vehicle controller of the in-vehicle system. FIGS. 9A and 9B show the sixth embodiment. As shown in the drawings, reference numeral 6 designates a vehicle controller; 7 designates a seat position controller; and 201 designates a vehicle network. The vehicle controller 6 and the portable cellular phone 5 are interconnected by way of the vehicle network 201, and the vehicle controller 6 and the seat position controller 7 are interconnected by way of the vehicle network 201. The vehicle controller 6 comprises an operation control section 61, an individual identification section 62, and a communications section 63. Reference numeral 306 designates user profile information in which a portable cellular phone number is associated with a seat position parameter (a setting status identification code for specifying one of a plurality of seat positions).

The operation of the car navigation system will now be described. As shown in FIG. 9, the individual identification section 62 of the vehicle controller 6 acquires a portable cellular phone number of the portable cellular phone 5 connected to the vehicle network 201, byway of the communications section 63. A seat position parameter corresponding to an acquired portable cellular phone number is determined by the same method as employed in the second embodiment, and the seat position parameter is transmitted to the operation control section 61. The operation control section 61 transmits the thus-received seat position parameter to the seat position controller 7 connected to the vehicle network 201, by way of the communications section 63, thereby commencing changing of a seat position. The seat position controller 7 performs an operation for changing a seat position in accordance with the received seat position parameter.

The seat position parameter describes, for example, a fore-and-aft distance from a certain reference point and the inclination angle of a seat back.

As has been described, in the present embodiment, the individual identification section 62 determines a seat position in accordance with a portable cellular phone number. Further, the operation control section 61 controls the seat position controller 7 such that a determined seat position is acquired. By means of the user merely connecting his portable cellular phone 5 to the vehicle network 201, a driving position (i.e., a seat position) suitable for the driver can be provided, thereby enabling safe driving.

In the sixth embodiment, a device controlled by the vehicle controller 6 is taken as a seat position controller. However, the vehicle controller 6 may control an engine controller or a mirror position controller in accordance with a portable cellular phone number.

In the sixth embodiment, the vehicle controller 6 is connected, by way of the communications section 63, to the portable cellular phone 5 and the seat position controller 7, which are connected to the vehicle network 201. As in the case of the second embodiment, the vehicle controller 6 may be connected directly to the vehicle network 201.

Seventh Embodiment

Figures 10A, 10B:
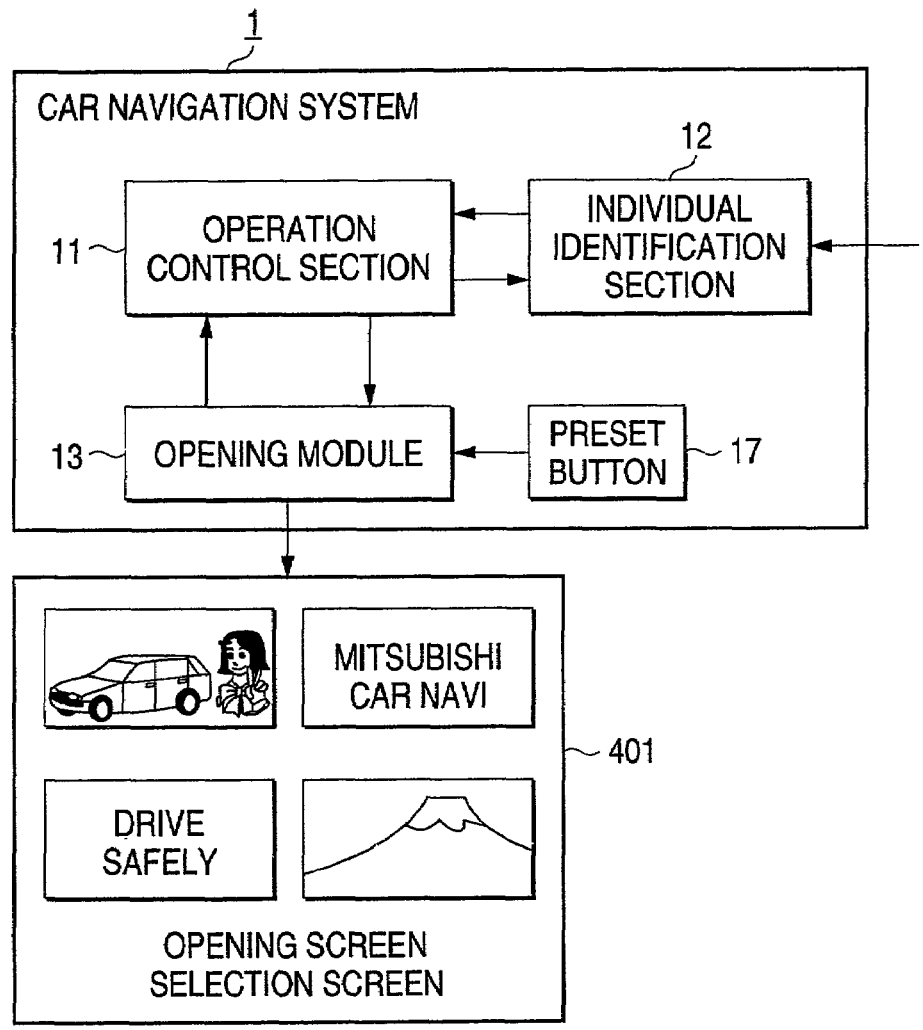
FIGS. 10A and 10B are illustrations showing a car navigation system according to a seventh embodiment of the present invention.

In the first, second, fourth, and sixth embodiments, user profile information—in which individual identification information, such as an individual ID or a portable cellular phone number, is associated with a setting status identification code, such as an opening parameter, a pallet parameter, and a seat position parameter—is stored in an device installed in a vehicle beforehand. Alternatively, the user profile information is newly added or prepared. However, updating and storing the setting status identification code which has already been specified is also possible, in association with an individual ID or a portable cellular phone number. FIGS. 10A and 10B show such an embodiment. As shown in the drawings, reference numeral 17 designates a preset button to be pressed by a user, and 401 designates an opening screen selection screen.

The operation of the car navigation system 1 will now be described.

As shown in FIGS. 10A and 10B, the opening module 13 performs an operation for displaying an opening screen selection screen. The user selects a preferred screen through use of a remote controller appended to the car navigation system, or an input device such as a touch panel. Then, the user presses the preset button 17. The opening module 13 transmits the name of a bitmapped file of the selected screen to the operation control section 11. The operation control section 11 transmits the received name of the bitmapped file for an opening screen to the individual identification section 12. Further, the operation control section 11 outputs a user profile information update request to the individual identification section 12. Upon receipt of a user profile information update request from the operation control section 11, the individual identification section 12 updates the user profile information 302 to be described later.

Figure 11:
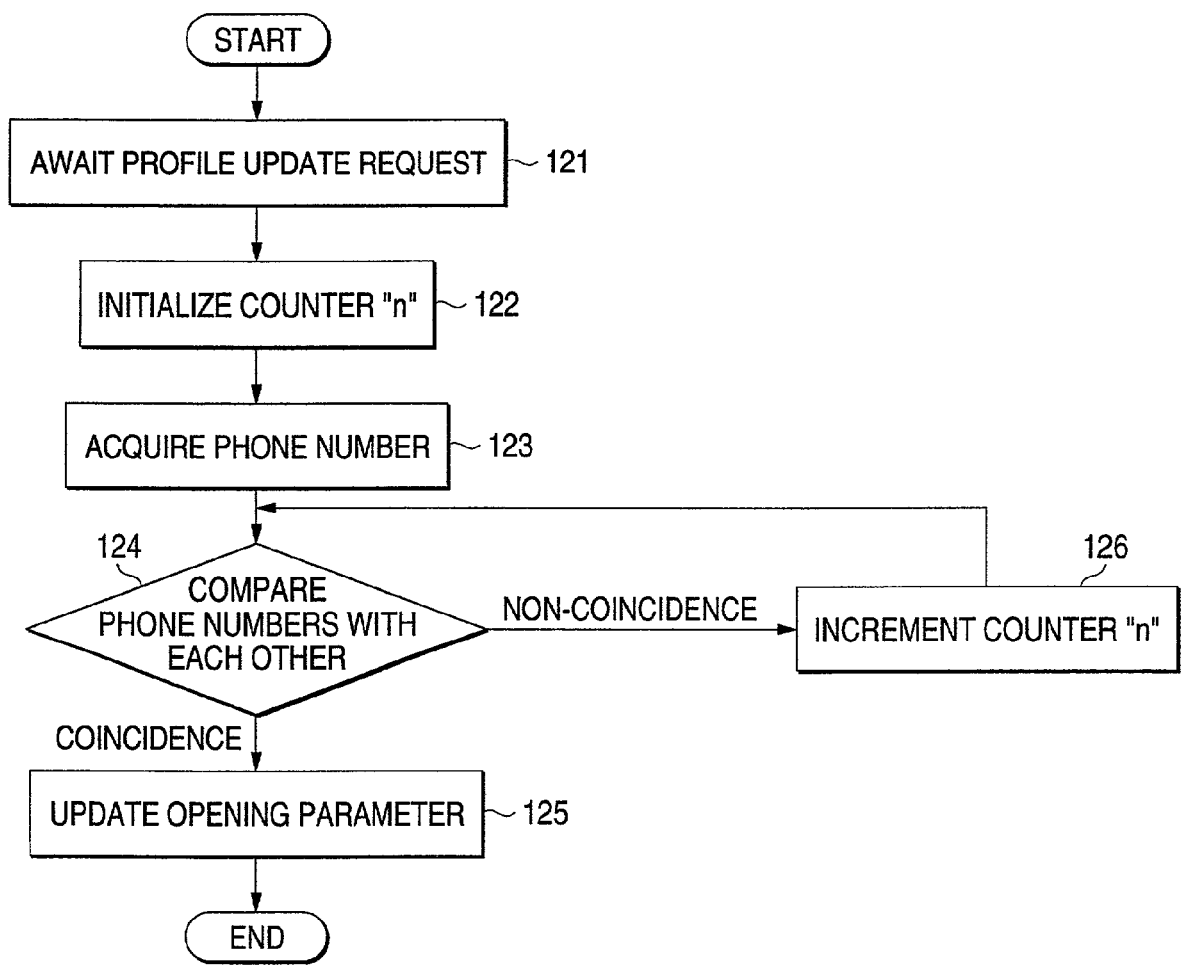
FIG. 11 is a flowchart showing updating of user profile information according to the seventh embodiment.

Updating of the user profile information to be performed by the individual identification section 12 is described by use of a processing flowchart shown in FIG. 11.

The individual identification section 12 awaits a user profile update request output from the operation control section 11 (step 121). After the counter "n" has been initialized (n=1) (step 122), the phone number of the portable cellular phone 5 connected to the car navigation system 1 is acquired in the same manner as in the second embodiment (step 123). Next, a phone number described in the $n^{th}$ row of the user profile information 302 that has already been stored is compared with the phone number acquired from the portable cellular phone 5 (step 124). If a match is found, the name of a bitmapped file for the opening screen which is the $n^{th}$ opening parameter is replaced with the name of the bitmapped file transmitted from the operation control section 11, and processing is completed (step 125). If no match is found, the counter "n" is incremented (step 126), and processing returns to a comparison between phone numbers (step 124), and is continued thereafter.

In the seventh embodiment, a change is made to solely an opening screen. Even in the fourth and sixth embodiments, an operation for setting an device installed in a vehicle can be changed.

In the seventh embodiment, after selection of an opening screen, the user presses the preset button 17. Here, pressing of the preset button 17 may be replaced with a screen selection operation.

As mentioned above, in the seventh embodiment, the setting status identification code of the individual-adaptive system (i.e., in the present embodiment, the car navigation system 1) set by the user is updated and stored in association with individual identification information about the user (i.e., a portable cellular phone number in the present embodiment). The next time the user utilizes the individual-adaptive system (car navigation system), the setting status can be automatically changed to the setting status corresponding to an updated parameter.

Eighth Embodiment

Figure 12B:
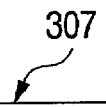
Figure 12C:

The first through seventh embodiments show examples in which setting information, such as a setting status identification code required for changing the operation of an device installed in a vehicle, is stored in the device installed in a vehicle or the individual identification information generator. Here, the setting information may be stored in an information center to which the car navigation system 1 is to be connected by way of a network such as a portable cellular phone network, and the thus-stored setting information, such as parameters, maybe loaded by way of the network. Transmission of individual identification information to the information center and downloading of setting information from the information center may be implemented by providing, in the device installed in a vehicle, communications means capable of establishing communication with the information center. The individual identification section may transmit, to the information center, the individual identification information entered by the individual identification information generator by way of the communications means. Further, the individual identification section may receive from the information center setting information about a device corresponding to the individual identification information. In a case where the individual identification information generator has communications means like that of a portable cellular phone, the portable cellular phone number entered from the portable cellular phone may be transmitted to the information center. Setting information about a device corresponding to the portable cellular phone may be received from the information center. FIGS. 12A, 12B and 12C are illustrations showing the latter case. As shown in the drawings, reference numeral 8 designates an information distribution device disposed in the information center (hereinafter called an "information center"); 202 designates a portable cellular phone cell site; and 203 designates a public telephone line network. The information center 8 comprises a data receiving section 81 for receiving data from the public telephone line network 203; an individual information storage section 82 in which are stored individual identification information, such as a portable cellular phone number and a setting status identification code (setting information about a device) corresponding to the individual identification information; an individual information reading section 83 for reading data from the individual information storage section 82; and a data transmission section 84 for sending data to the public telephone line network 203. Reference numeral 307 designates user profile information in which a portable cellular phone number is associated with an opening parameter (setting status identification code). The user profile information 307 is stored in the individual information storage section 82. Here, the opening parameter is composed of the name of a bitmapped file and the name of a moving image file. Reference numeral 308 designates transmission information to be sent from the information center 8 (i.e., setting information about a device); that is, an opening parameter corresponding to a portable cellular phone number.

The following description is based on the assumption that the opening module 13 of the car navigation system 1 according to the eighth embodiment can display a static image such as a JPEG (Joint Photographic Coding Experts Group) file or a bitmapped file but cannot reproduce a motion picture such as an MPEG (Motion picture Experts Group) file 2 and that the operation control section 1 knows the capability of the opening module 13.

The operation of the car navigation system 1 will now be described.

In the car navigation system 1, the individual identification section 12 acquires a portable cellular phone number from the portable cellular phone 5 in the same manner as mentioned previously. The thus-acquired phone number is transmitted to the information center 8 by way of the portable cellular phone 5, the portable cellular phone cell site 202, and the public telephone line network 203. The individual identification section 12 receives the information 308 (i.e., the setting information about a device) which has been transmitted from the information center 8 by way of the public telephone line network 203, the portable cellular phone cell site 202, and the portable cellular phone 5. The thus-received information is sent to the operation control section 11. From the information 308 received from the individual identification section 12 (i.e., the setting information about a device), the operation control section 11 extracts information which can be processed by the opening module 13 (i.e., in the present embodiment, the name of a static image file). The thus-extracted information is transmitted to the opening module 13, where the opening module is started. Processing to be performed by the opening module 13 is the same as that in the first embodiment, and hence repeated explanation thereof is omitted.

The information center 8 performs an operation of a data receiving section 81 transmitting, to the individual information reading section 83, the portable cellular phone number transmitted from the car navigation system 1. The individual information reading section 83 compares the portable cellular phone number transmitted from the data receiving section 81 with the portable cellular phone number in the user profile information 307 stored in the individual information storage section 82. The information center 8 reads an opening parameter corresponding to a matching phone number and transfers the thus-read opening parameter to the data transmission section 84 while taking the parameter as the transmission information (setting information about a device) 308. The data transmission section 84 transmits the transmission information (setting information about a device) 308 transmitted from the individual information reading section 83, to the car navigation system 1 by way of the public telephone line network 203, the portable cellular phone cell site 202, and the portable cellular phone 5.

As mentioned above, in the individual-adaptive system according to the eighth embodiment (i.e., the car navigation system), the individual identification section 12 transmits individual identification information acquired from an individual identification information generator having communications means such as a portable cellular phone, to the information center 8 by way of the individual information identification information generator having communications means. The information center 8 determines the received setting information about a device corresponding to the individual identification information (here an opening parameter). The information center 8 transmits the thus-determined setting information to a device, such as the car navigation system 1, by way of the individual identification information generator, while the thus-determined setting information is taken as transmission information. The determined set information is transmitted to a device, such as a car navigation system, by way of the individual identification information generator having communications means. The car navigation system of the individual identification section 12 is arranged so as to change the setting status (i.e., an opening screen) of the system on the basis of the received setting information. As a result, there is no necessity of storing user profile information in the car navigation system, thereby diminishing the amount of memory required by the individual identification information generator. Further, there is no necessity of storing setting information about the car navigation system in the individual identification information generator. Hence, the amount of memory required by the individual identification information generator can be diminished. Further, even when the present invention is applied to a system other than the car navigation system 1, there is yielded the same advantage as that mentioned above.

In the eighth embodiment, the information 308 transmitted from the information center 8 includes solely the name of a bitmapped file and the name of a moving image file. However, the name of a bitmapped file for an opening screen or the name of a motion picture file may be transmitted directly from the information center 8 to the car navigation system 1.

In the eighth embodiment, the information 308 transmitted from the information center 8 is entered, in its present form, into the car navigation system 1. However, the transmission information may be temporarily stored in the portable cellular phone 5. In this case, the advantage of the amount of memory required by the individual identification information generator being diminished is lost. When the car navigation system 1 is connected to the information center 8 by way of the portable cellular phone 5, there is no necessity of transmitting the transmission information, if the transmission information stored in the portable cellular phone is identical with the transmission information stored in the information center. Hence, there is yielded an advantage of a reduction in communications costs.

In the eighth embodiment, the individual identification information transmitted from the individual identification section 12 is embodied in a portable cellular phone number. However, the name of an individual or a model number of a portable cellular phone may also be used as individual identification information.

Ninth Embodiment

In the individual-adaptive system according to the eighth embodiment (i.e., the car navigation system 1), the individual identification section 12 has temporarily acquired individual identification information from the individual identification information generation means. The thus-acquired individual identification information is sent to the information center by way of the communications means provided in a device or in the individual identification information generation means. Thus, the car navigation system acquires setting information about the device. However, in a case where the individual identification information generator has communications means such as a portable cellular phone, an instruction for sending a portable cellular phone number to the information center may be issued to the portable cellular phone without the individual identification section acquiring individual identification information. The setting information about a device corresponding to a portable cellular phone number may be taken into the portable cellular phone from the information center, and the setting information acquired into the portable cellular phone may be acquired.

In this case, there is no necessity of the individual identification section 12 identifying individual identification information by means of entry of individual identification information. The only requirement is that the individual identification section 12 should have only an input/output section, the section having the function of issuing, to a portable cellular phone, an instruction for sending a portable cellular phone number to an information center and the function of serving as an input section for entering setting information about the device acquired into the portable cellular phone. The device is identical in structure with that shown in FIG. 12, and the individual identification section 12 acts as an input/output section.

Even in the ninth embodiment, there is no necessity of storing user profile information into the car navigation system, as in the case of the eighth embodiment. The amount of memory required by the car navigation system can be diminished. Further, there is no necessity of storing setting information about the car navigation system in the individual identification information generator, thereby diminishing the amount of memory required by the individual identification information generator. Further, even when the present invention is applied to a device other than a car navigation system, there is yielded the same advantage.

Tenth Embodiment

Figure 13:
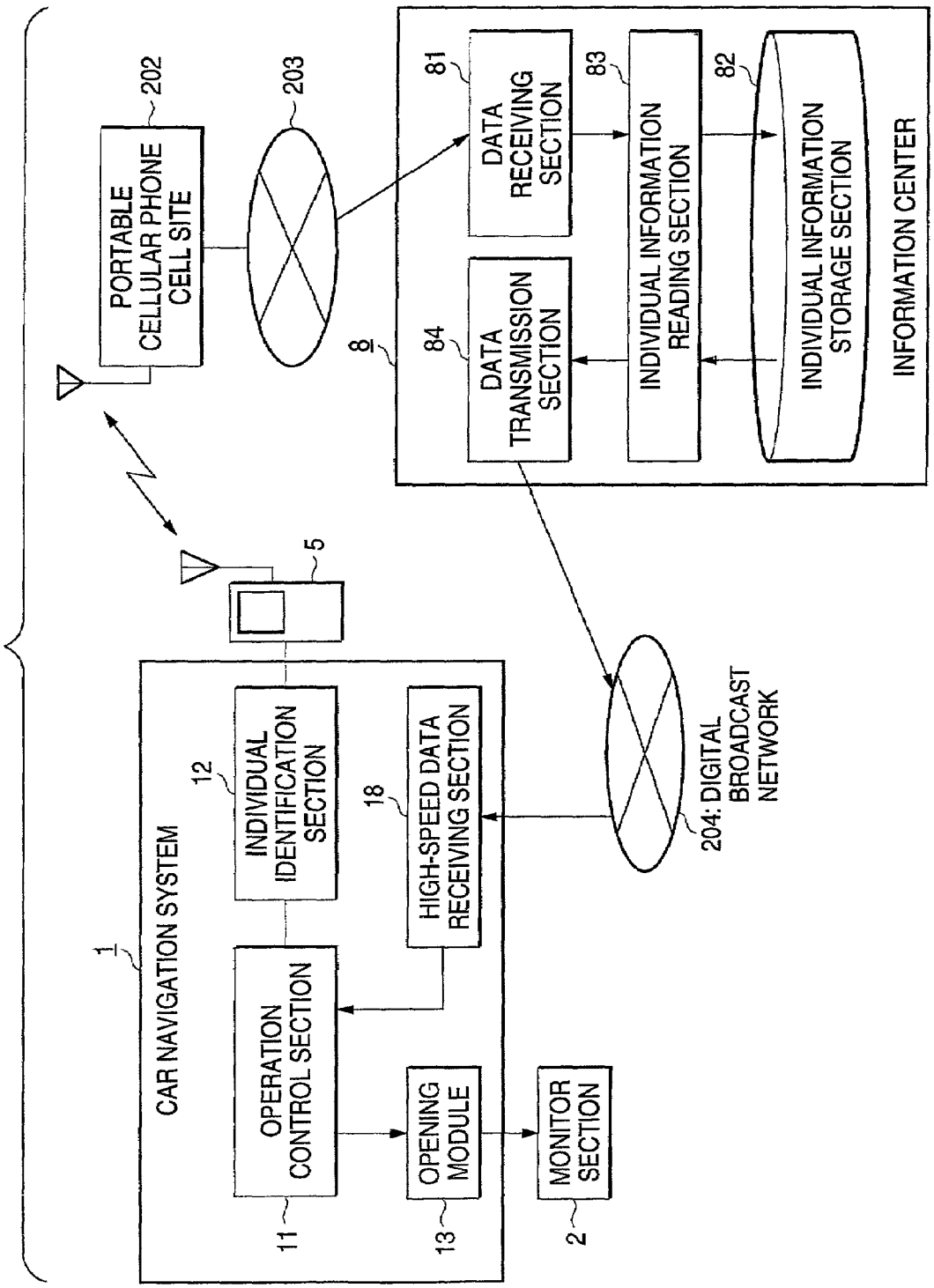
FIG. 13 is an illustration showing a car navigation system according to a tenth embodiment of the present invention.

In the eighth embodiment, when the transmission information (setting information about a device) 308 is transmitted from the information center 8, the information is transmitted by way of the public telephone line network 203, the portable cellular phone cell site 202, and the portable cellular phone 5. However, the information may be transmitted by way of a network other than the up line (i.e., a line from the car navigation system to the information center). FIG. 13 shows such an embodiment. As shown in the drawing, reference numeral 18 designates a high-speed data receiving section; and 204 designates a digital broadcast network.

In addition to the constituent elements described in connection with the eighth embodiment, the car navigation system 1 shown in FIG. 13 further comprises the high-speed data receiving section 18 for receiving the information transmitted from the information center 8 by way of the digital broadcast network 204. Further, a data transmission section 84 of the information center 8 is connected to the digital broadcast network 204.

The operation of the car navigation system will now be described.

In the eighth embodiment, the individual identification section 12 receives the information transmitted from the information center 8. In the tenth embodiment, the high-speed data receiving section 18 receives the information transmitted from the information center 8 by way of the digital broadcast network 204, and sends the thus-received transmission information to the operation control section 11 (in other respects, the car navigation system operates in the same manner as in the eighth embodiment).

The data transmission section 84 of the information center 8 sends the transmission information generated by the individual information reading section 83 to the car navigation system 1, by way of the digital broadcast network 204 (in other respects, the car navigation system operates in the same manner as in the eighth embodiment).

As mentioned above, in the tenth embodiment the transmission information to be transmitted from the information center to the car navigation system can be transmitted by way of the digital broadcast network. Hence, information can be transmitted at speed higher than information transmitted by a portable cellular phone.

In the tenth embodiment, the data transmission section 84 transmits transmission information by way of only the digital broadcast network 204. However, data may be transmitted, by means of selectively switching between a public telephone line network (or a portable cellular phone network) and the digital broadcast network 204, according to the type of data to be transmitted.

In the tenth embodiment, the digital broadcast network 204 is used as a down network (i.e., a line from the information center to the car navigation system). A high-speed network, such as a dedicated short-range communication (DSRC), may also be employed.

Even in the ninth embodiment, a digital broadcast network may also be employed as a down network (i.e., a line from the information center to the car navigation system), as in the case of the tenth embodiment.

Eleventh Embodiment

Figure 14A:
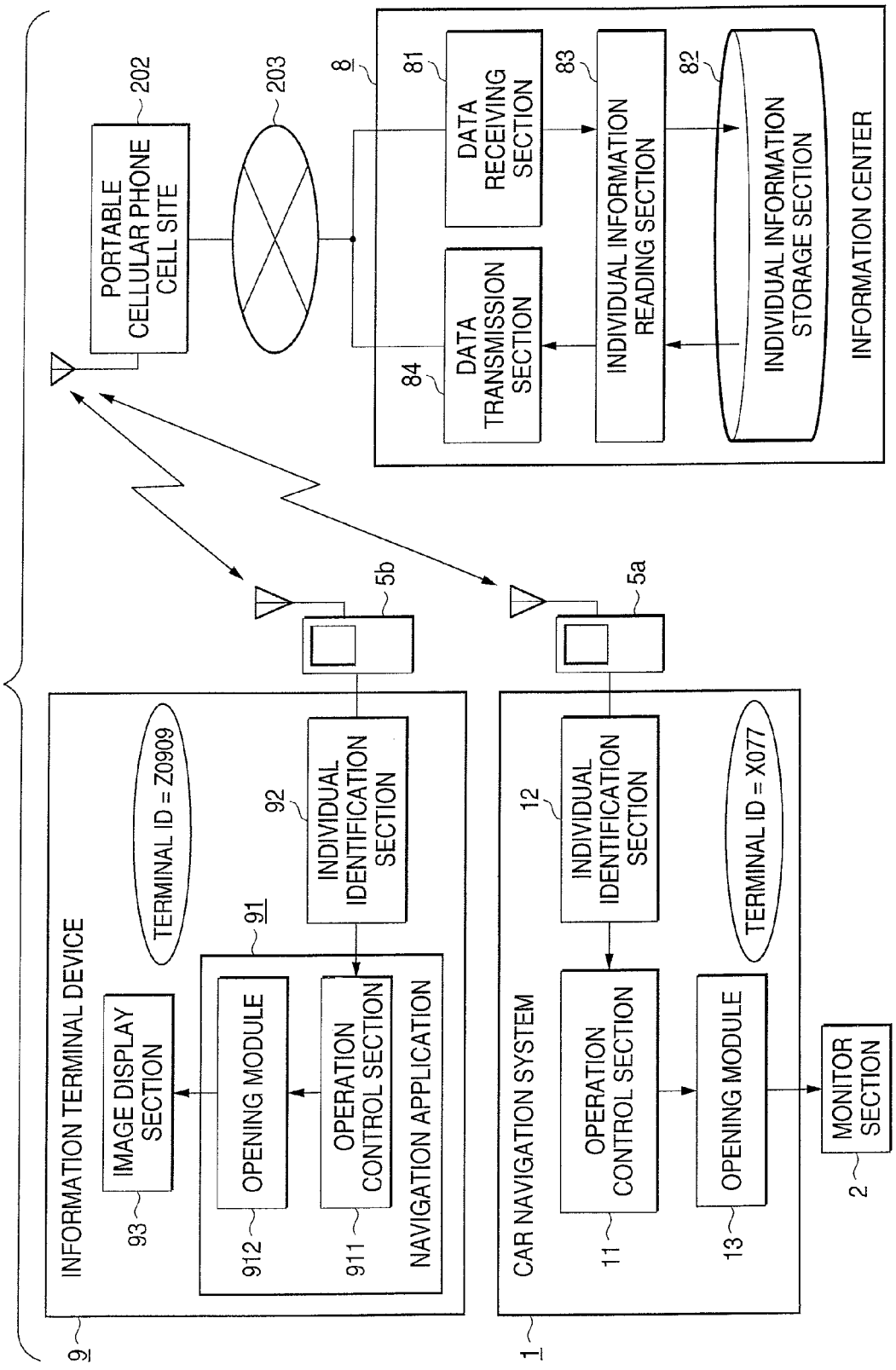

In the eighth and tenth embodiments, what is transmitted from the car navigation system 1 to the information center 8 is mere individual identification information such as a portable cellular phone number. A terminal ID assigned to the car navigation system 1 (i.e., device type identification information) may be transmitted as individual identification information. The eleventh embodiment is shown in FIGS. 14A to 14C. As shown in the drawings, reference numeral 9 designates an information terminal device, such as a PDA. A portable cellular phone 5a is connected to the car navigation system 1, and another portable cellular phone 5b is connected to the information terminal device 9.

The car navigation system 1 is assigned a terminal ID "X0077." The opening module 13 of the car navigation system 1 can display only a static image.

The information terminal device 9 comprises a navigation application section 91; an individual identification section 92; and a monitor section 93 for outputting a result of operation of the information terminal device 9. The navigation application section 91 comprises an operation control section 911 for controlling operations of individual modules of the navigation application; and an opening module 912 for displaying a startup screen of the navigation application.

The information terminal device 9 is assigned a terminal ID "Z0909," and the opening module 912 of the navigation application 91 can display both a static image and a motion picture.

Reference numeral 309 designates transmission information transmitted from the information center 8 to the information terminal device 9; and 310 designates transmission information transmitted from the information center 8 to the car navigation system 1.

The operation of the car navigation system 1 will now be described.

The individual identification section 12 of the car navigation system 1 transmits the acquired individual identification information (i.e., a portable cellular phone number) and the device type identification information (i.e., a terminal ID) assigned to the car navigation system 1 are transmitted to the information center 8 by way of the portable cellular phone 5a, the portable cellular phone cell site 202, and the public telephone line network 203. The individual identification section 12 receives information (setting information about a device) 310 transmitted from the information center 8 by way of the public telephone line network 203, the portable cellular phone cell site 202, and the portable cellular phone 5a. Thereafter, the same processing as that performed in the eighth embodiment is performed.

Similarly, the individual identification section 92 of the information terminal device 9 transmits the individual identification information (the portable cellular phone number) acquired in the same manner as in the second embodiment and the device type identification information (terminal ID) assigned to the information terminal device 9, to the information center 8 by way of the portable cellular phone 5b, the portable cellular phone cell site 202, and the public telephone line network 203. The individual identification section 92 receives information 309 (i.e., setting information about a device) transmitted from the information center 8 by way of the public telephone line network 203, the portable cellular phone cell site 202, and the portable cellular phone 5a. Further, the individual identification section 92 transmits the thus-received information 309 to the operation control section 911. The operation control section 911 and the opening module 912 of the navigation application 911 in the information terminal device 9 operate in the same manner as the operation control section 11 and the opening module 13 of the car navigation system 1. Hence, repeated explanations thereof are omitted.

The data receiving section 81 of the information center 8 receives the individual identification information (i.e., a portable cellular phone number) and the device type identification information (i.e., a terminal ID) transmitted from the car navigation system 1 or the information terminal device 9 by way of the public telephone line network 203. The data receiving section 81 then transmits the thus-received individual identification information (i.e., a portable cellular phone number) and the device type identification information (i.e., a terminal ID) to the individual information reading section 83. The individual information reading section 83 retrieves and extracts, from the user profile information 308, setting information matching individual identification information matching the received individual identification information (i.e., a portable cellular phone number) in the same manner as in the eighth embodiment. Thereafter, the individual information reading section 83 extracts, as transmission information, setting information corresponding to the device type identification information (terminal ID) in a manner to be described later. The thus-extracted setting information is transmitted to the data transmission section 84.

Generation of transmission information to be performed by the data reading section 83 will be described by use of an example. The terminal ID representing device type identification information comprises a numeric string representing a number unique to the terminal. A character representing the type of a device is added to the top of the numeric string. By reference to the terminal type string provided at the head of the numeric string, the data reading section 83 produces setting information corresponding to the terminal ID from the retrieved and extracted setting information, in accordance with a rule that X means a mere bitmapped file, Y means a mere motion picture file, and Z means both a bitmapped file and a motion picture file.

In the eleventh embodiment, a device, such as a device installed in a vehicle or an information terminal device, transmits device type identification information, such as a terminal ID, to the information center along with individual identification information. The information center produces setting information corresponding to the thus-transmitted device type identification information and individual identification information, and transmits the setting information to the device installed in a vehicle or the information terminal device. Hence, unnecessary data can be omitted from the down network (i.e., a line from the information center to the device), thereby increasing the overall data transmission speed of the network. Further, there is no necessity of the device selectively diminishing information, and hence processing load imposed on the device can be reduced in the present embodiment when compared with the eighth embodiment.

In the eleventh embodiment, a portable cellular phone network is utilized as a down network. As described in connection with the tenth embodiment, the network may be replaced with a high-speed network such as a digital broadcast, or both the high-speed network and the down network may be employed.

Even when, in the third, fifth, and ninth embodiments, a device type identification information such as a terminal ID is transmitted to a portable cellular phone or an information center, when the portable cellular phone or the information center produces setting information corresponding to the thus-transmitted device type identification information and individual identification information, and when the thus-produced setting information is sent to an device installed in a vehicle or the information terminal device, there will be yielded the same advantage as that yielded in the present embodiment.

Twelfth Embodiment

Figures 15A, 15B, 15C:
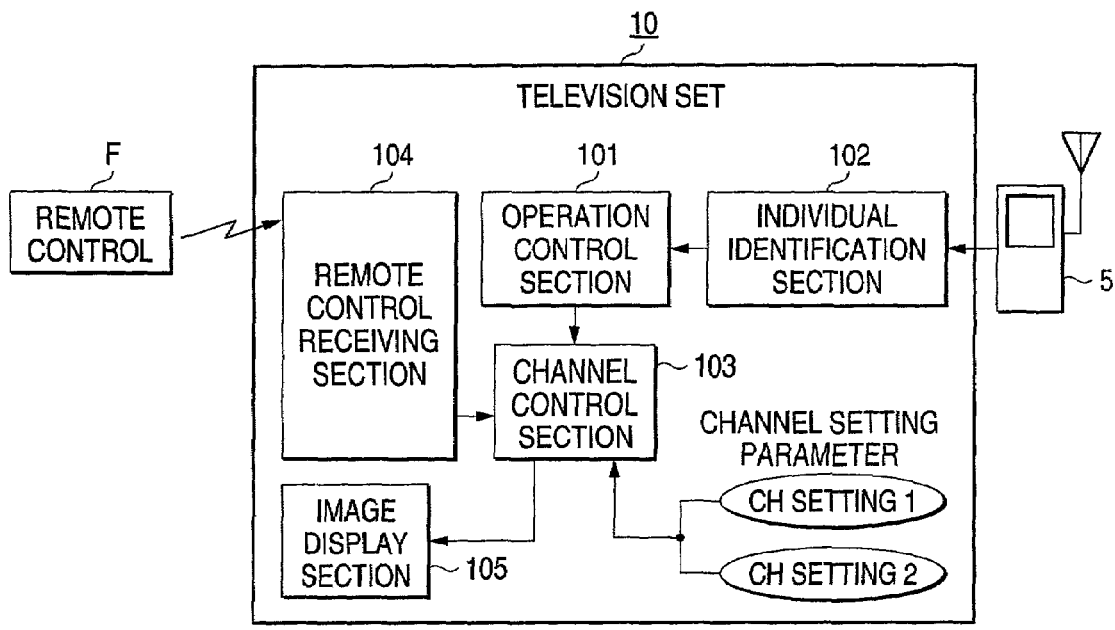
FIGS. 15A to 15C are illustrations showing a television set according to a twelfth embodiment of the present invention.

FIGS. 15A to 15C are illustrations showing an example in which a television set is employed as an individual-adaptive system according to a twelfth embodiment of the present invention. FIG. 15A is a block diagram; FIG. 15B is an illustration showing an example of user profile information according to the twelfth embodiment; and FIG. 15C is an illustration showing a setting status of each channel setting parameters according to the twelfth embodiment. As shown in the drawings, reference numeral 10 designates a television set; and 20 designates a remote controller attached to the television set. The television set 10 comprises an operation control section 101; an individual identification section 102; a channel control section 103; a remote control receiving section 104; and a screen display section 105. Reference numeral 311 designates user profile information in which a portable cellular phone number is associated with a channel setting parameter, and the user profile information is stored in the individual identification section 102.

The operation of the television set will now be described.

In the television set 10, the individual identification section 102 acquires a phone number from the portable cellular phone 5 in the same manner as in the second embodiment. The channel setting parameter (i.e., the setting status identification code) corresponding to the acquired portable cellular phone number is determined on the basis of user profile information 311. The thus-determined channel setting parameter is transmitted to the operation control section 101. The operation control section 101 transmits the received channel setting parameter to the channel control section 103. The setting status possessed by the channel control section 103 is updated to a setting status represented by the received channel setting parameter.

As shown in FIG. 15C, the channel setting parameter means a channel number of a television program and the setting status of a receiver station. Channel numbers and setting statuses of the receiver stations pertaining to a plurality of channel setting parameters are stored in the television set beforehand. One of the channel setting parameters is specified.

The remote control receiving section 104 transmits the channel number entered by way of the remote controller 20 to the channel control section 103. The channel control section 103 determines, from the updated channel setting parameter, a receiver station corresponding to the channel number received from the remote control receiving section 104. The remote control receiving section 104 controls the screen display section 105 so as to display an image pertaining to the thus-determined receiver station.

As mentioned above, in the twelfth embodiment, the individual identification section of the television set acquires a phone number of a portable cellular phone. A channel setting parameter to be referred by the channel control section is changed in accordance with the thus-acquired phone number. Hence, a channel number setting meeting the preference of the person who attempts to watch television can be made without the person performing a special system setting.

The twelfth embodiment shows an example in which the television set 10 is connected to the portable cellular phone 5 by means of a cable. However, they may also be interconnected over the air by means of, e.g., Bluetooth.

The first through twelfth embodiments have described a case where an ID card or a portable cellular phone is used as an individual identification information generator. Individual identification information stored in a remote controller attached to a car navigation system or stored in an electronic toll collection (ETC) device may also be employed. Any type of device can be employed, so long as the device can be connected to an individual-adaptive system, portable, and have individual identification information.

The first through twelfth embodiments have described the individual-adaptive system by means of taking as examples the car navigation system, the vehicle controller, the information terminal device, and the television set. Even general-purpose devices used by a plurality of users may be subjected to the previous embodiments or a combination thereof.

As has been described above, an individual-adaptive system according to the present invention comprises:

an individual identification section which can be connected to an individual identification information generator having individual identification information, enables entry of individual identification information from the individual identification information generator, and determines a setting status of a device in accordance with the input individual identification information; and an operation control section which controls the setting status of the device on the basis of the setting status determined by the individual identification section. The present invention yields an advantage of the ability to automatically use a common general-purpose system which can be used by anybody as a personal device suitable for the user, without involvement of the user performing a special operation.

An individual-adaptive system according to the present invention comprises:

an individual identification section which can be connected to an individual identification information generator having individual identification information, enables entry of individual identification information from the individual identification information generator, and determines a setting status of a device installed in a vehicle in accordance with the input individual identification information; and an operation control section which controls the setting status of the device installed in a vehicle on the basis of the setting status set by the individual identification section. Hence, even when noticeable variations exist among individuals with regard to utilization of a device installed in a vehicle, by means of identifying the user reliably, a system setting is automatically switched, without fail, to a system setting suitable for the user. As a result, the safety of the device installed in the vehicle is improved. Further, there is yielded an advantage of the user saving labor relating to system setting.

In the individual-adaptive system according to the present invention, the individual identification section has storage means for storing individual identification information and the setting status of the system corresponding to the individual identification information, and compares the individual identification information entered from the individual identification information generator with the individual identification information stored in the storage means, thereby determining as the setting status of the system a setting status corresponding to a matched individual identification information. Hence, the setting status of the device can be automatically changed to a setting status initially set by an individual user. Hence, there is yielded an advantage of obviating a necessity of re-entry of the setting status of the device.

Preferably, the individual-adaptive system according to the present invention further comprises means of adding or changing the individual identification information stored in the storage means or the setting status of a device corresponding to the individual identification information. There is yielded an advantage of the individual-adaptive system enabling system setting suitable for the user even when the user's preference has changed and providing ease of operation.

In the individual-adaptive system, a setting status of a device corresponding to individual identification information stored in the storage means is stored by means of a setting status identification code for specifying one from a plurality of predetermined setting statuses of the device. Hence, changes in system operations can be effected easily and in real time.

The individual-adaptive system according to present invention further comprises communications means capable of establishing communication with an information distribution device which stores individual identification information and setting information about a device corresponding to the individual identification information; wherein the individual identification section transmits, to the information distribution device, individual identification information entered from the individual identification information generator by way of the communications means and receives, from the information distribution device, setting information about a device corresponding to the individual identification information, thereby determining the setting status of the device. Hence, there can be obviated a necessity of the device and the individual identification information generator having individual identification information and setting information about a device corresponding to the individual identification information, thereby diminishing the amount of memory consumed.

In the individual-adaptive system according to the present invention, the individual identification section can be connected to an individual identification information generator having individual identification information and communications means; transmits individual identification information entered from the individual identification information generator to an information distribution device which stores individual identification information and setting information about a device corresponding to the individual identification information, by way of the communications means of the individual identification information generator; and receives from the information distribution device setting information about a device corresponding to the individual identification information, thereby determining the setting status of the device. Hence, there can be obviated a necessity of the device and the individual identification information generator having individual identification information and setting information about a device corresponding to the individual identification information, thereby diminishing the amount of memory consumed.

The present invention also provides an individual-adaptive system comprising:

an input section which can be connected to an individual identification information generator having stored therein individual identification information and setting information about a device; and inputs the setting information from the individual identification information generator; and an operation control section for controlling the setting status of the device in accordance with the entered setting information. Hence, there can be obviated a necessity of the device and the individual identification information generator having individual identification information and setting information about a device corresponding to the individual identification information, thereby diminishing the amount of memory consumed.

The present invention also provides an individual-adaptive system comprising:

an input/output section which can be connected to an individual identification information generator having individual identification information and communications means; issues an instruction for sending the individual identification information, to an information distribution device which stores individual identification information and setting information about a device corresponding to the individual identification information; and inputs into the individual identification information generator setting information about the device acquired from the information distribution device; and an operation control section for controlling the setting status of the device on the basis of the entered setting information. Hence, there can be obviated a necessity of the device and the individual identification information generator having individual identification information and setting information about a device corresponding to the individual identification information, thereby diminishing the amount of memory consumed.

In the individual-adaptive system according to the present invention, the system has device type identification information; outputs the device type identification information to the individual identification information generator or the information distribution device; and acquires from the individual indentification information generator or the information distribution device setting information about a device corresponding to the device type identification information. Since the device can obviate entry of unnecessary setting information, there is yielded an advantage of the ability to diminish the amount of memory consumed and to facilitate control processing.

In the individual-adaptive system according to the present invention, only required setting information is extracted from setting information entered from the individual identification information generator or the information distribution device. There is no necessity of causing the individual-adaptive system to transmit only setting information corresponding to a device. Therefore, there is yielded an advantage of the ability to diminish a load to the individual identification information generator or the information distribution device.

The present invention also provides an information distribution device comprising:

storage means for storing individual identification information and setting information about an individual-adaptive system corresponding to the individual identification information;

receiving means for receiving individual identification information from the individual-adaptive system;

reading means for comparing the received individual identification information with the individual identification information stored in the storage means and for reading setting information corresponding to matched individual identification information from the storage means; and transmission means for transmitting the read setting information to the individual-adaptive system. Hence, use of a common general-purpose device as an individual-adaptive system suitable for a user is supported, and a load imposed on the individual-adaptive system can be reduced.

In the information distribution device according to the present invention, the receiving means receives, from the individual-adaptive system, device type identification information about the individual-adaptive system and individual identification information; and reading means reads from storage means setting information corresponding to the device type identification information and individual identification information. Hence, information to be transmitted to the individual-adaptive system can be minimized, thereby enabling an increase in transmission speed.

What is claimed is:

1. An individual-adaptive system comprising:
   an individual identification section connectable to a cellular telephone for input of respective individual identification information unique to the cellular telephone, from the cellular telephone, and determining setting status of a device in accordance with the individual identification information input; and
   an operation control section which controls the setting status of the device based on the setting stats determined by the individual identification section.

2. The individual-adaptive system according to claim 1, wherein the individual identification section includes storage means for storing respective individual identification information and the setting status of the system corresponding to respective individual identification information, and comparing the individual identification information input from the cellular telephone with the individual identification information stored in the storage means, thereby determining as the setting stats of the system the setting stats corresponding to the individual identification information matched.

3. The individual-adaptive system according to claim 2, further comprising means for one of (i) adding to and (ii) changing the individual identification information stored in the storage means and the setting status of a device corresponding to the individual identification information.

4. The individual-adaptive system according to claim 2, wherein setting status of a device corresponding to individual identification information stored in the storage means is stored with a selling status identification code specifying one from a plurality of setting statuses of the device.

5. The individual-adaptive system according to claim 1, wherein
   the cellular telephone establishes wireless communication with an information distribution device which stores individual identification information and setting information for a device and corresponding to the individual identification information, and
   the individual identification section transmits, to the information distribution device, wirelessly, by way of the cellular telephone, individual identification information input from the cellular telephone and receives, wirelessly, from the information distribution device, setting information for a device corresponding to the individual identification information, thereby determining the setting status of the device.

6. The individual-adaptive system according to claim 5, wherein the system
   has device type identification information,
   outputs the device type identification information to one of the cellular telephone and the information distribution device, and
   acquires setting information about a device corresponding to the device type identification information from one of the cellular telephone and the information distribution device.

7. The individual-adaptive system according to claim 5, wherein only setting information required is extracted from setting information entered from one of the individual cellular telephone and the information distribution device.

8. The individual-adaptive system according to claim 1, wherein the individual identification section
   is connectable to the cellular telephone having individual identification information,
   wirelessly transmits individual identification information entered from the individual cellular telephone to an information distribution device which stores individual identification information and setting information for a device corresponding to the individual identification information, by way of the cellular telephone, and receives setting information about a device corresponding to the individual identification information wirelessly from the information distribution device, thereby determining the setting status of the device.

9. The individual-adaptive system according to claim 1, wherein the cellular telephone is connectable to the individual identification section through a wired connection.

10. The individual-adaptive system according to claim 1, wherein the individual identification information consists of the telephone number of the cellular telephone.

11. An individual-adaptive system comprising:

an input section connectable to a cellular telephone, the cellular telephone having stored therein (i) individual identification information unique to the cellular telephone and setting information for a device, and (ii) receiving the setting information from the cellular telephone; and an operation control section for controlling setting status of the device in accordance with the setting information received.

12. The individual-adaptive system according to claim 11 wherein the cellular telephone is connectable to the individual identification section through a wired connection.

13. The individual-adaptive system according to claim 11, wherein the individual identification information consists of the telephone number of the cellular telephone.

14. An individual-adaptive system comprising:

an input/output section connectable to a cellular telephone and producing, for input, individual identification information unique to the cellular telephone, issuing an instruction for wirelessly sending the individual identification information to an information distribution device which stores individual identification information and setting information for a device corresponding to the individual identification information, and inputting into the individual cellular telephone setting information for the device acquired from the information distribution device; and an operation control section for controlling setting status of the device based on the setting information input.

15. The individual-adaptive system according to claim 14, wherein the system has device type identification information, outputs the device type identification information to one of the individual cellular telephones and the information distribution device, and acquires setting information about a device corresponding to the device type identification information from one of the individual cellular telephones and the information distribution device.

16. The individual-adaptive system according to claim 14, wherein only setting information required is extracted from setting information entered from one of the individual cellular telephones and the information distribution device.

17. The individual-adaptive system according to claim 14, wherein the individual identification information consists of the telephone number of the individual cellular telephone.

18. An information distribution device comprising:

storage means for storing individual identification information and setting information for an individual-adaptive system corresponding to the individual identification information;

receiving means for receiving individual identification information from the individual-adaptive system that has received the individual identification information from a cellular telephone, the individual identification information being unique to the cellular telephone;

reading means for comparing the individual identification information received with the individual identification information stored in the storage means and for reading from the storage means setting information corresponding to the individual identification information matched; and transmission means for transmitting the setting information read to the individual-adaptive system.

19. The information distribution device according to claim 18, wherein the receiving means receives, from the individual-adaptive system, device type identification information for the individual-adaptive system and individual identification information, and the reading means reads from the storage means setting information corresponding to the device type identification information and the individual identification information.

20. The information distribution device according to claim 18, wherein the individual identification information consists of the telephone number of the cellular telephone.

21. An individual-adaptive system comprising:

a plurality of wireless communication means producing respective individual identification information;

an individual identification section connectable to an individual cellular telephone for input of individual identification information, unique to the cellular telephone, from the individual cellular telephone, and determining setting status of an in-vehicle device in accordance with the individual identification information input; and an operation control section which controls the setting status of the in-vehicle device based on the setting status set by the individual identification section.

22. The individual-adaptive system according to claim 21, wherein the plurality of wireless communication means comprises cellular telephones.

23. The individual-adaptive system according to claim 22, wherein the cellular telephones are connectable to the individual identification section through a wired connection.

24. The individual-adaptive system according to claim 21, wherein the individual identification information consists of the telephone number of the individual cellular telephone.

* * * * *